(No Model.) 3 Sheets—Sheet 1.
J. C. BALLEW.
MACHINE FOR SAWING BARREL HOOPS.
No. 455,980. Patented July 14, 1891.
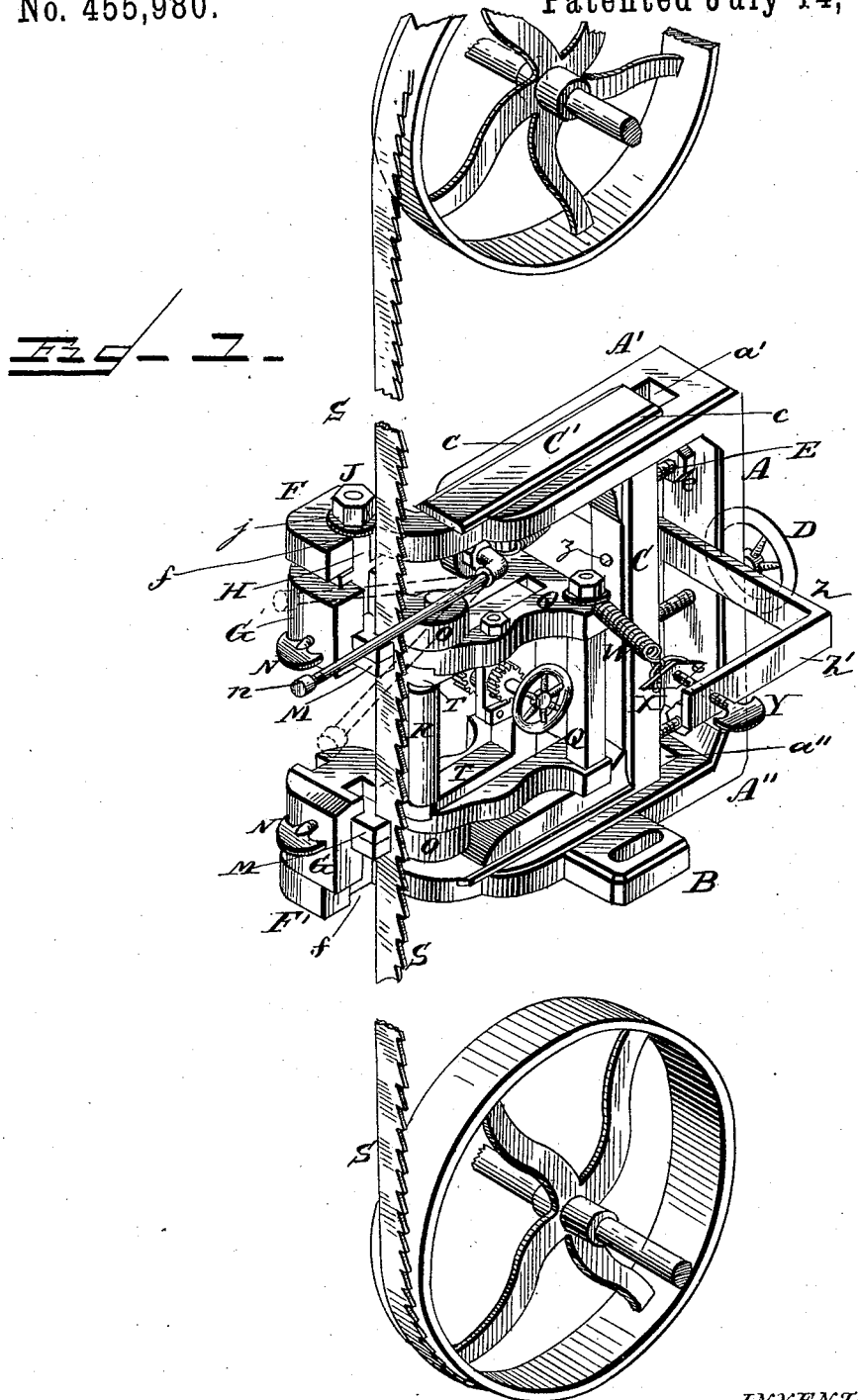
WITNESSES:
INVENTOR:
John C. Ballew,
by Suis Dagger & Co,
Attorneys.

(No Model.) 3 Sheets—Sheet 2.
J. C. BALLEW.
MACHINE FOR SAWING BARREL HOOPS.
No. 455,980. Patented July 14, 1891.
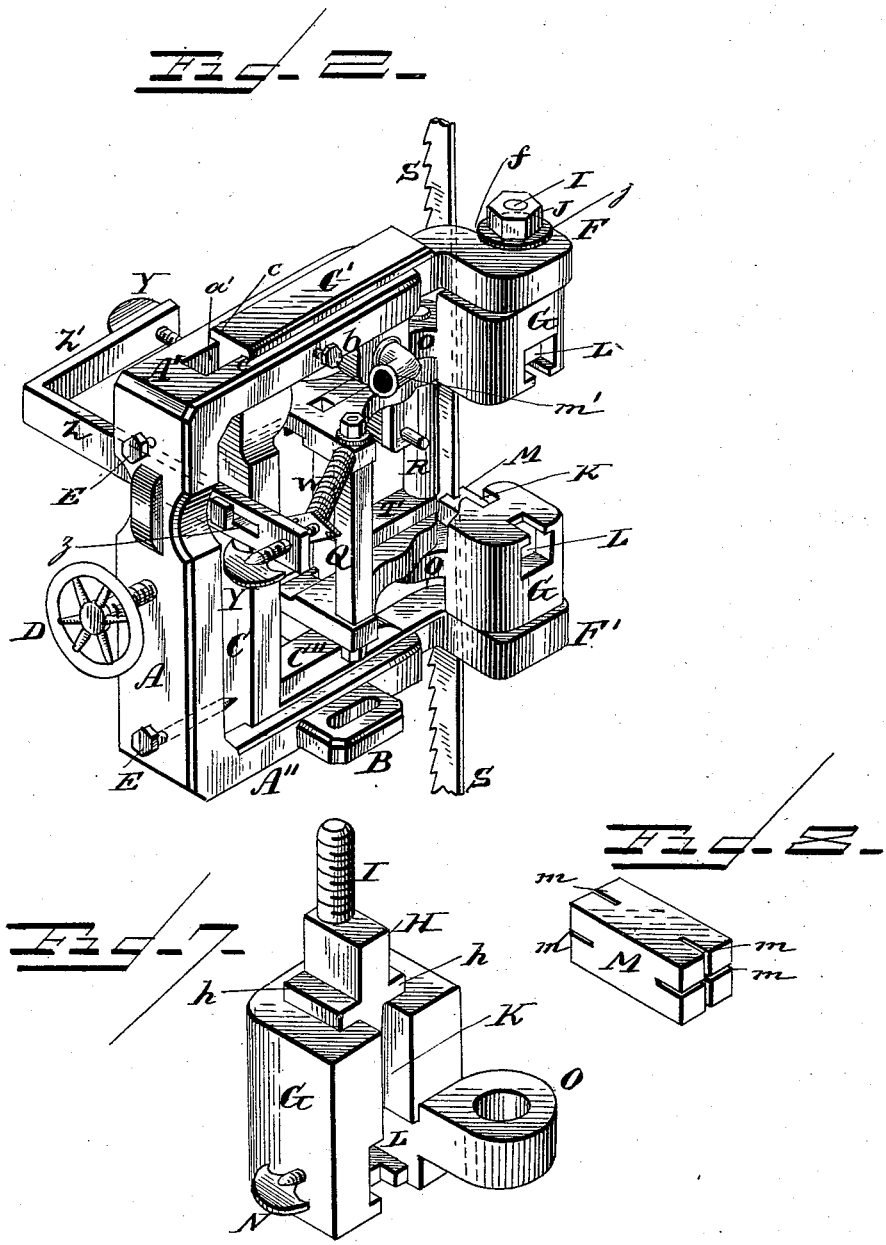

(No Model.) 3 Sheets—Sheet 3.
J. C. BALLEW.
MACHINE FOR SAWING BARREL HOOPS.
No. 455,980. Patented July 14, 1891.
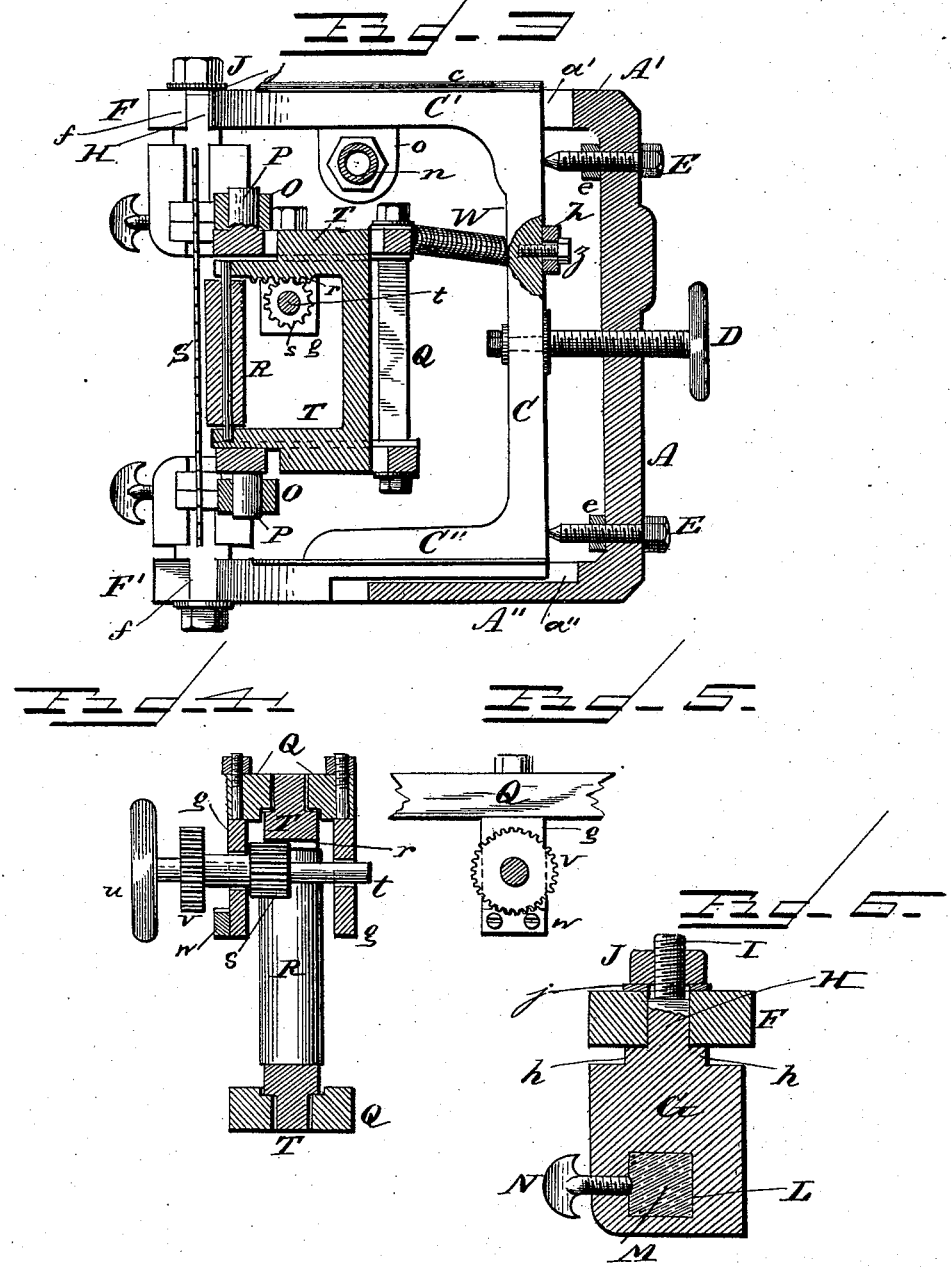
WITNESSES:
INVENTOR:
John C. Ballew,
Attorneys.

UNITED STATES PATENT OFFICE.

JOHN C. BALLEW, OF EVANSVILLE, INDIANA.

MACHINE FOR SAWING BARREL-HOOPS.

SPECIFICATION forming part of Letters Patent No. 455,980, dated July 14, 1891.

Application filed February 24, 1891. Serial No. 382,447. (No model.)

*To all whom it may concern:*

Be it known that I, JOHN C. BALLEW, a citizen of the United States, and a resident of Evansville, in the county of Vanderburgh and State of Indiana, have invented certain new and useful Improvements in Machines for Sawing Barrel-Hoops; and I do hereby declare that the following is a full, clear, and exact description of the invention, which will enaable others skilled in the art to which it appertains to make and use the same, reference being had to the accompanying three sheets of drawings, which form a part of this specification.

This invention relates to band-saws especially adapted for the sawing of barrel-hoops from poles; and it consists in an improved construction and arrangement of the device for guiding the poles to be sawed into hoops by the band-saw. Of this class of band-saw machines there may be said to be two types—viz., one in which the saw runs through stationary guides in true alignment with the upper and lower band wheels or pulleys at all times, independent of the position or adjustment of the roller, which forms a lateral support and guide for the pole as it is fed through the machine to be sawed into hoops, and another type in which the band-saw guide is connected and combined with said pole-supporting guide or roller, so that that part of the saw which runs between its upper and lower guides and which does the cutting will be swerved or twisted by bending it laterally, so as to cause it to cut into the pole or kerf in parallelism (or about so) with the surface of the pole, this object being attained by making the saw-guides movable in their bearings and connecting them with the movable roller which guides and supports the poles laterally while they are passing through the machine.

I desire it to be distinctly understood at the outset that my invention relates to the first of these types, in which the saw-guides are stationary, so as not to laterally deflect or swerve the saw; and it consists in the improved construction of the mechanism for guiding the poles and aligning the band-saw with the band wheels or pulleys, which will be hereinafter set forth, whereby I produce a simple, strong, and efficient machine without the drawbacks incident to that type of machines in which the saw-blade is swerved or twisted, experience having amply demonstrated that this twisting or lateral deflection of the saw is apt to cause frequent breakage of saws, owing to the high rate of speed at which they are run through the guides.

On the accompanying three sheets of drawings, Figure 1 is a perspective view of my improved machine. Fig. 2 is a similar view showing the machine from the opposite side. Fig. 3 is a longitudinal sectional view on a vertical plane through the middle of the machine. Figs. 4 and 5 are detail views of the mechanism for adjusting the vertical guide-roller. Fig. 6 is a sectional detail view of one of the saw-guide heads or bearings. Fig. 7 is a perspective detail view of one of said heads or bearings detached from the machine, and Fig. 8 is a detail view of one of my improved slotted guide-blocks removed from its head or bearing.

Like letters of reference denote corresponding parts in all the figures.

The main frame of my improved machine consists of a casting A, having an upper and lower arm A' and A", projecting at right angles parallel to each other, said lower arm A" having laterally-projecting slotted ears B, by means of which the frame may be securely bolted to the table of the band-saw. Both of the arms A' and A" are slotted longitudinally, as shown at a' and a", to receive the movable inside frame C, which, like the stationary main frame A, consists of a vertical back-piece and two arms C' and C", projecting therefrom at right angles parallel to each other and having laterally-extending wings or flanges c, overlapping the slots in which this frame is inserted and slides, so as to form guides as the frame is moved forward or back. This forward or back motion (or adjustment) of the frame C inside of the stationary frame A is effected by means of a screw D, having a hand-wheel at its outer end for manipulating it and working in a threaded bearing in the fixed part A. After the movable frame has been so adjusted that the wooden guide-blocks (to be hereinafter described and in which the saw runs) at its outer end are in proper alignment with the upper and lower band-wheels, the frame C is locked in place either by means of a jam-screw b, inserted through one side of either one of the stationary arms A' or A'', so as to bind with its inner end against the corresponding sliding arm, or else by means of two bolts (shown at E) working through threaded bearings in the upright A on opposite sides of the central adjusting-screw D, said bolts being locked after adjustment by means of the lock-nuts e on the inner side of upright A.

The forward ends of the two arms C' and C'', which project beyond the corresponding arms of the stationary frame, are bent laterally in horizontal planes to form bearings F and F' for the heads which support the movable frame that carries the guide-roller and also hold the wooden guide-blocks in position. One of these heads (both being constructed alike) is shown as it appears when removed from the machine in Fig. 7 and in section in Fig. 6, on reference to which figures it will be seen that it consists of a casting G, having at one end a projecting squared neck or tenon H, terminating in a screw-threaded bolt I. The neck H is of such size and shape that it will fit into the squared recess f in its appropriate bearing F or F', and has laterally-projecting shoulders h h, which take against the fixed bearing when the head is placed in position and prevent it from moving vertically, and is fastened by means of its appropriate nut J and washer j.

In the front side of the head G, in alignment with the square neck H and its shoulders or offsets h h, is cut a slot or longitudinal recess K, extending from top to bottom and intersected transversely and at right angles by a square aperture L, which forms a seat for the wooden guide-blocks M. These are simply blocks of wood of suitable length and square in cross-section, so as to fit loosely into the recesses L, in which, after they have been first properly adjusted, they are held in place removably by means of a binding-screw N.

Each of the guide-blocks M (of which there is of course one for each of the heads G) has two slots or kerfs m at each end, intersecting each other at right angles, which form the guides proper for the band-saw, which is shown at S. After one of these guide-kerfs has been unduly enlarged by friction against the saw the position of the block may be changed by loosening the binding-screw N, so as to present a fresh kerf, and as there are four of these guide-kerfs in each block it will thus be seen that one of my improved blocks will outlast an ordinary block with a single guide slot or kerf, as one to four. In other words, my improved quadruple-kerfed and reversible guide-block will last as long as four of the ordinary single-kerfed blocks ordinarily used on band-saw guides.

Each of the heads G is cast with a projecting ear O on one side, which is bored through, so as to form a journal for one of the pintles or gudgeons P of the vibrating inside frame Q, which carries the vertical guide-roller R. This part of my improved machine is constructed and arranged to operate substantially like the same part in the machine for sawing barrel-hoops for which Letters Patent of the United States No. 372,446 were granted to me on November 1, 1887, with this important difference, however, that motion of this vibrating frame Q does not affect the saw-guides or saw, as in the machine described and claimed in Patent No. 372,446; but the saw-guides and the roller R, which guides the pole to be sawed into hoops, are entirely independent of each other, the saw-guides being stationary during the operation of the machine, while the roller is movable as regards the position in which it is presented to the saw. This vertical roller R, which, during the operation of the machine, forms a lateral support or bearing for the pole which is being fed through the machine, is journaled in a sliding head or yoke T, mounted in the horizontally swinging or oscillating frame Q, the pintles P P of which are, as we have seen, journaled in the ears or bearings O of the stationary heads G. The sliding yoke T is provided with a toothed rack r, Figs. 4 and 5, with which meshes a pinion s, fastened upon a shaft or spindle t, which is journaled transversely in the outer frame Q. This spindle t has a small hand-wheel u for turning it in order to advance or recede the yoke T, in which roller R is journaled, and it also has a small ratchet-wheel v, adapted to engage and interlock with the teeth upon a rack-bar w at the lower end of a bracket g, depending from the upper arm of frame Q, said bracket forming one of the bearings for the adjusting shaft or spindle t. When this spindle is in its normal position, its ratchet-wheel v will be in engagement with the teeth of the rack-bar w, so that the spindle is held stationary and cannot be turned to either side; but by pulling hand-wheel u out from the frame, so as to disengage the ratchet-wheel from the bar and at the same time to bring the pinion s in engagement or mesh with the toothed rack r, the head T may be moved forward or back within the frame Q, thereby adjusting the distance between the saw and the vertical guide-roller R, so as to regulate the thickness of the hoop by increasing or diminishing the distance between the saw and said guide-roller R. It will be seen that after this roller has been properly adjusted and locked its distance from the saw cannot vary, except to the slight extent afforded by the oscillations of frame Q—that is to say, the axis of roller R will always maintain the same position in a plane perpendicular to and parallel with the saw-blade, but may yield (without changing this position) to pressure against the periphery of the roller by swinging slightly with its yoke T and frame Q upon the pintles P P in an arc of which a line drawn through the axis of said pintles will form the center. This yielding or deflection of the roller is sufficient to permit a sinuous or irregular pole to pass through the machine without deflecting the saw, and after a knot or other unevenness has been passed the roller will at once resume its normal position. In other words, instead of swerving or deflecting the saw I swerve or deflect the roller without in the least affecting the saw and only sufficient to allow knots or irregular places on the pole to pass between the saw and the guide-roller, so that the body of the hoop will be of even thickness from end to end. To permit frame Q to yield in this manner its rearward part is provided with two springs W attached thereto at opposite sides, and connected at their free ends by swivels X to thumb-screws Y, which work in bearings in an arm Z, fastened adjustably upon and at right angles to the upright C. This arm is bent at right angles to form an elbow Z' at one end, to the outer end of which one of the springs W is attached by its swivel X, and the tension of the springs may be regulated at will by adjusting the thumb-screws Y, and also to a certain extent by the adjustment of arm Z upon the upright C, the fastening-bolt z passing through an oblong slot in the arm, so that by loosening said bolt the position of arm Z Z' upon the upright C may be shifted so as to bring both springs in their proper and most effective position relative to frame Q. The tension of these springs should be so adjusted that the oscillating frame with its roller will always of itself assume its normal position relative to the saw after it has been moved by the passage of knots or protuberances on a pole passing between the saw and the roller.

In this class of machines it is of very great importance, in order to obtain satisfactory results, that the saw be kept free from the gum and sap which exudes from the poles during the process of sawing, and which, if not removed, will soon gum up the saw so that it cannot pass through the guide-kerfs or through the kerf in the pole without considerable friction, which not only retards motion, but is apt to heat and break the saw. Appreciating this fact, I have patented a device for removing gum from saws, (Letters Patent No. 358,323, dated February 22, 1887,) adapted to be used with a machine of this type by connecting the hot-water reservoir by means of a pipe with the elbow m' of another pipe n, fastened in a bracket o, depending from the upper arm A' of the stationary main frame. This pipe n is movable, as indicated by the dotted lines in Fig. 1, and has a narrow slit (not shown) near its outer end on the side facing the saw, so that it will spray a jet of hot water against the saw-blade before this enters the kerf in the upper fixed guide-block, and thereby wash off the sap and gum, so as to present a clean and bright cutting-edge to the pole and clean sides to the guides through which it passes, thereby reducing friction and resistance to a minimum.

As I have pointed out at the beginning of this specification, the combination of the stationary main frame A A' A'' and adjustable frame C C' C'' is an important feature of my improvement, because it makes it possible to align the band-saw and its stationary guides perfectly with the peripheries of the upper and lower band-wheels over which the saw runs after the main frame has been bolted to the table, and this alignment may be renewed or adjusted at any time, as occasion requires, without disturbing the main frame. The thickness of the hoop may be gaged by regulating the distance between the axis of the roller R and the cutting-edge of the saw simply by moving the yoke or frame T, in which the roller is journaled, forward or back within frame Q by means of the adjusting-wheel u and spindle t, as hereinbefore described. After the roller has been locked in its adjusted position the thickness of the hoop will not vary, as the roller will yield only to crookedness or unevenness in the pole and will resume its normal position after such crookedness or sinuosities have passed by the roller.

Having in the foregoing clearly described my improved machine, I claim as my improvement, and desire to secure by Letters Patent of the United States, the following:

1. The combination of the band-saw, the exterior stationary frame bolted to the saw-table, the inside frame sliding in ways in the exterior stationary frame and provided at its outer ends with bearings, the saw-guides seated therein, the screw for adjusting said inside frame, and means, substantially as described, for locking said frame in its adjusted position after proper alignment of the saw and its guides.

2. The combination of the adjustable frame having bearings F F', slotted heads G, having shoulders h, square neck H, and bolt I, and provided with binding-screws N, and removable slotted guide-blocks M, substantially as and for the purpose set forth.

3. The combination of the adjustable frame having bearings F F', slotted heads G, provided with lugs O, projecting tenons H, with shoulders h h and screw-threaded bolt I, frame Q, journaled at its forward end in said bearings, yoke or frame T, adjustable within the last-named frame and carrying the guide-roller R, and springs W, substantially as and for the purpose herein shown and set forth.

In testimony that I claim the foregoing as my own I have hereunto affixed my signature in presence of two witnesses.

JOHN C. BALLEW.

Witnesses:
CHARLES H. THUMAN,
WM. WENDT.